United States Patent [19]

Owens et al.

[11] Patent Number: 5,062,913

[45] Date of Patent: Nov. 5, 1991

[54] LAMINATED TILE PRODUCT AND METHOD FOR PRODUCING THE SAME

[75] Inventors: Charles R. Owens, Alexandria, Va.; Luigi Guazzoni, Novara, Italy

[73] Assignee: Charles R. Owens, Alexandria, Va.

[21] Appl. No.: 375,726

[22] Filed: Jul. 5, 1989

Related U.S. Application Data

[63] Continuation-in-part of Ser. No. 177,947, Apr. 5, 1988, Pat. No. 4,931,331.

[51] Int. Cl.$^5$ .............................................. B32B 31/00
[52] U.S. Cl. ...................................... 156/154; 156/89; 156/63; 156/250; 156/254; 156/257; 428/47; 428/49; 52/386; 52/391; 52/612
[58] Field of Search ................. 156/264, 250, 297, 61, 156/258, 89, 194, 262, 184, 63, 60, 284; 428/44, 45, 47, 49, 55, 99, 137, 150, 156, 167, 210; 52/612, 390, 391, 389, 386, 387, 309.17

[56] References Cited

U.S. PATENT DOCUMENTS

| | | | |
|---|---|---|---|
| 2,878,666 | 3/1959 | Drummond | 156/89 |
| 3,878,030 | 4/1975 | Cook | 428/15 |
| 4,218,496 | 8/1980 | Savignac | 428/15 |

Primary Examiner—Ellis P. Robinson
Assistant Examiner—Donald J. Loney
Attorney, Agent, or Firm—Antonelli, Terry, Stout & Kraus

[57] ABSTRACT

A method for producing a laminated tile product is disclosed which comprises provided a sheet of natural stone having opposed first and second major surfaces and providing a plurality of ceramic substrates, each of the plurality of ceramic substrates having opposed first and second major surfaces. An adhesive material is provided on at least one of the first major surface of the sheet of natural stone and the first major surface of each of the plurality of ceramic substrates. The plurality of ceramic substrates and the sheet of natural stone are assembled such that the first surface of each of the plurality of ceramic substrates faces the first major surface of the sheet of natural stone with the adhesive material therebetween. Preferably, the second major surface of the ceramic substrate is polished and then the second major surface of the sheet of natural stone is polished. The resulting laminated assembly may be cut into a plurality of tiles. The laminated tiles produced by the method are also disclosed.

15 Claims, 5 Drawing Sheets

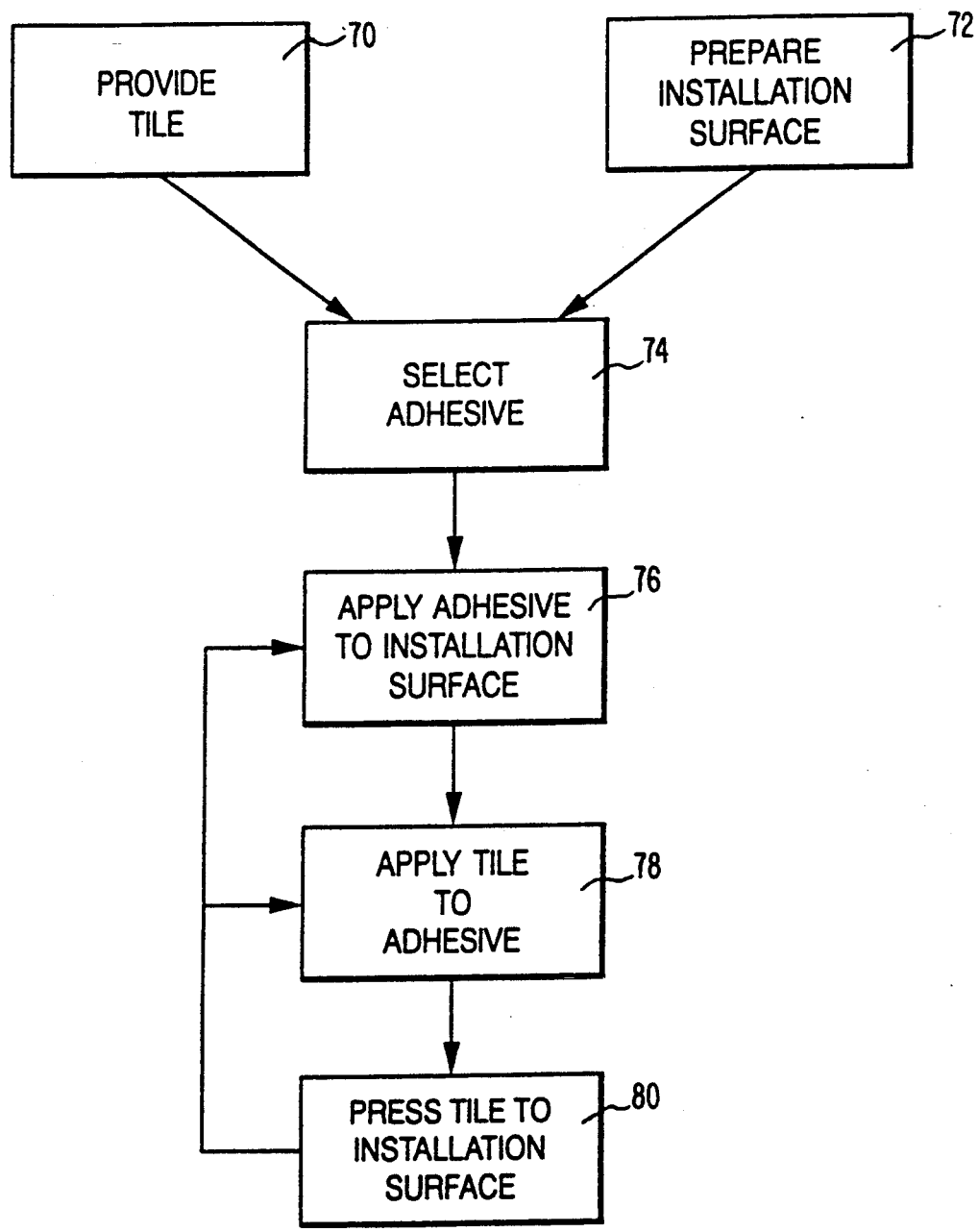

LAMINATED TILE PRODUCT AND METHOD FOR PRODUCING THE SAME

CROSS-REFERENCE TO RELATED APPLICATION

This application is a continuation-in-part of U.S. Pat. application Ser. No. 07/177,947, filed Apr. 5, 1988, now U.S. Pat. No. 4,931,331, the contents of which are incorporated herein by reference.

TECHNICAL FIELD

The present invention relates to a laminated tile product having an upper laminate of natural stone and a lower substrate of ceramic tile, a method for producing the same and a method for installing the same.

BACKGROUND ART

It is desirable to provide a tile product having the appearance of solid natural stone such as marble, but without the disadvantages of solid stone. Natural stone such as marble is often used as a floor or wall covering tile. A single piece or slab of natural stone such as marble is generally cut and finished to form a tile of desired size and shape. However, due to the high density of natural stones such as marble, tiles of acceptable thickness are very heavy. Thinner tiles, on the other hand, have limited strength and tend to shatter or break.

Conventional natural stone tile, e.g., marble, is very difficult to install, and installation is generally accomplished by an experienced "marble man," i.e., installation of marble is generally not thought of as a "do-it-yourself" project.

One of the most difficult aspects of natural stone, e.g., marble, installation is the selection of an appropriate mortar mix to adhere the stone to the, e.g., wall or floor. Marble mortar mix is fundamentally composed of mortar and sand. However, different pieces of natural stone require different mixes. The mix is chosen primarily based on the density of the stone which "marble men" learn to judge by feel, touch, sound, sight and even taste. "Marble men" routinely exchange information regarding techniques and variations for mixing mortar, sand and other components to make various mortar mixes. The selection and mixing of mortar mixes can be thought of more as an art than a science. Additives are mixed with mortar and sand, such as perlite which adds body to the mix to give it more "stand-up" ability. The additives are also chosen for their sound insulation qualities. As a consequence of the knowledge required to lay natural stone tiles, the installation costs on a square foot basis are high and, further, there is a limited supply of skilled masons who are available to install natural stone tiles.

Conventional natural stone tiles must be installed by "floating" the tiles on the mortar mix; that is, the back surface of the tile is not brought into contact with the surface on which it is being installed. Thus, a further difficulty in installing conventional natural stone tiles resides in the need to use a mortar mix having the correct thickness and viscosity to float the stone tiles so that the upper surfaces of all the installed tiles are level. Thickness variations within each tile and between a plurality of tiles further complicate installation. These thickness variations are due to the fact that the major surfaces of the stone slabs which are ground and polished to form tiles are not flat. Thus, there is no flat surface to serve as a datum plane during the grinding and polishing operations.

The problem of selection and mixing of appropriate adhesives is particularly acute when the installation design requires use of multiple colors of stone, multiple types of stone or both multiple colors and multiple types of stone. For example, as shown in FIG. 1, an installation design may require use of more than one type of natural stone tile. For example, two types of natural stone tile designated A and B may be required. The types A and B may differ in color or may differ in the type of natural stone, e.g., type A may be marble and type B may be slate. Using conventional natural stone tiles, a different mortar mix may preferably be used for type A than would be used for type B. Differences in density even among type A tiles or among type B tiles may require selection and use of different mortar mixes. These factors contribute to the difficulty of installing conventional natural stone tiles.

The installation of ceramic tiles is conventionally accomplished with mastics which are purchased in pre-mixed containers. The mastic has a standard viscosity which is easily worked with tools designed for ceramic tile installation. Furthermore, the ceramic tiles typically have protrusions to establish a uniform adhesive thickness and height with respect to the surface on which the ceramic tile is being installed. Unlike the installation of natural stone with mortar mixes, the installation of ceramic tile may be performed with less skilled labor including substantial installation on a "do-it-yourself" basis.

U.S. Pat. No. 3,878,030 to Cook states that the prior art has suggested solving some of the problems associated with natural stone, particularly with marble, by bonding a plurality of small pieces having the desired texture and thickness to an underlying piece of the same material. The underlying piece is then chosen from stone strata which does not have the desired texture and which is therefor less expensive. In this manner, the more expensive desirable pieces can be cut thin so as to increase their economic utilization and are bonded to a generally thicker layer of less valuable stone. However, it is disclosed that the bonding of stone to stone still produces a relatively thick and quite heavy structure. It is also disclosed that such stone-to-stone structures are brittle and require considerable care in finishing, handling, storage and installation. Cook proposes providing a piece of wood product, such as a fiberboard, as an underlayment, then applying a bonding material, preferably a two-part curable cement, to the under-layment and/or to one surface of a plurality of discrete pieces of relatively thin stone. The stone pieces are then placed on the top of the underlayment and the cement is allowed to cure to firmly bond the pieces to the underlayment. Thereafter, the bonded-together structure is subjected to a finishing operation including a grinding operation while being subjected to a water bath and then to a polishing operation such as the use of a felt polishing wheel in connection with a tin oxide slurry or powder.

U.S. Pat. No. 3,097,080 to Weir discloses an artificial stone facing plaque which comprises essentially a thin body with a decorative upper or forward face, and composed of a settable synthetic organic plastic material in which are embedded, at least partially, a plurality of pieces of relatively coarse aggregate. If desired, the plastic plaque may be bonded to a suitable backing strip which may be formed of any suitable material such as, for example, asbestos cement board. It is often desirable to have the top portion of the individual aggregate partially ground off to form the polished surfaces. In some instances, it is also desirable to have the exposed forward or top decorative face of the plaque smooth and polished. In such instances, the protruding portions of the aggregate and also a portion of the plastic face or surface are ground away so that the final exposed surface of the plaque is slightly below that of the original forward surface of the plastic body.

U.S. Pat. No. 4,621,001 to Bard discloses a tile-shaped composite element in which a ceramic tile serving as the visible tile is glued to a further ceramic tile serving as the base tile. Each tile is provided on the back with a nesting structure and glued together with this nesting structure back-to-back. Since the wall thickness of such a composite element may correspond to the usual wall thickness of shingles of conventional ceramic tiles, extremely thin tiles may be used as the base tile and the visible tile placed thereupon.

U.S. Pat. No. 4,640,850 to Marocco discloses a composite facing slab which comprises a sheet of natural stone, such as marble, and a protective layer constituted by a sheet of transparent glass. The latter is fixed to the face of the stone sheet intended to remain visible with the interpositioning of an interlayer of transparent thermoplastic material which can adhere to both the sheets and fills the surface defects of the stone sheet.

U.S. Pat. No. 4,664,955 to Clem discloses a composite laminate for use in paneling of walls, ceilings and other surfaces such as furniture and the like. The composite laminate comprises a polymeric sheet-like core having a pair of surfaces to which are bonded a metal foil so as to form a sandwich-type structure and wherein a lamina of natural facing stone is uniformly bonded to at least one of the pair of metal foils.

U.S. Pat. No. 4,036,929 to Gould discloses a method of forming decorative inserts in granite and the like. A cavity is cut or sandblasted in the stone to produce a decorative design. An epoxy resin base is inserted into the cavity and permitted to set. Decorative glass chips are arranged in a mosaic-like pattern in a resin of similar properties to the base and the mortar, and a bond is formed between the base resin, the mortar resin and the decorative chips to provide a pattern on the stone.

A product known as "GL Marble" manufactured by Technomaiera, S.p.A, is a natural marble sliced into thin sheets ¼" thick, reinforced with a coating of epoxy and glass fibers, and cut into standard sizes 1×2, 2×2 and 2×4. Marble Technics, Ltd., of New York, a distributor of this product, describes "ISO Marble" as an extension of the GL Marble technology wherein full size sheets of GL Marble are laminated as a facing of a sandwich panel whose core is a non-combustible vermiculite board with a backing of 1 mm bonderized steel. These types of products have the disadvantage that the thermal expansion coefficients of the marble and fiberglass backing are not matched.

Therefore, it is still desired to provide a tile product the appearance of which is equivalent to ordinary marble slab, but is lighter in weight and higher in strength than ordinary marble and presently available marble products.

DISCLOSURE OF THE INVENTION

The present invention provides a tile product having an upper laminate of natural stone and a lower laminate of ceramic tile, the appearance of which is equivalent to solid natural stone tile, but which is lighter in weight and higher in strength than natural stone and which is stable in moist environments, i.e., is moisture-impervious.

The present invention further is a method for producing a laminated tile product of the aforementioned type.

The present invention provides a method for installing a laminated tile product which avoids the difficulties encountered in installing conventional natural stone tile and enables installation by relatively unskilled individuals, i.e., enables "do-it-yourself" installation.

A laminated tile product in accordance with the present invention comprises a ceramic substrate or a plurality of ceramic substrates having opposed major surfaces, a layer of natural stone and an adhesive for bonding the layer of natural stone to one of the major surfaces of the ceramic substrate(s). The layer of natural stone preferably comprises a marble-type stone. The substrate is preferably made of an unglazed ceramic bisque. Such a tile product is stable in moist environments, may be precisely sized and shaped and exhibits high dimensional stability.

The tile product may be in the form of a panel or may be cut to form smaller tiles. The panel is useful, e.g., as a wall panel or building exterior panel. Such a panel is much lighter in weight and higher in strength than a conventional marble panel of equivalent size. These attributes enable the panel to be installed more easily and inexpensively as compared to conventional marble panels. For example, exterior building panels according to the present invention can be installed using framework requiring less load-bearing capability as compared to that required for conventional marble panels; accordingly, lighter weight framework may be utilized.

A method for producing a laminated tile according to the present invention includes producing a laminated tile comprising a sheet of natural stone having opposed first and second major surfaces. One or, more preferably, a plurality of ceramic substrates are provided, each of which have opposed first and second major surfaces. An adhesive material is provided on at least one of the first major surface of the sheet of natural stone and the first major surface of each of the plurality of ceramic substrates. The plurality of ceramic substrates and the sheet of natural stones are assembled such that the first surface of each of the plurality of ceramic substrates faces the first major surface of the sheet of natural stone, with adhesive material therebetween. Preferably, the second major surface of the ceramic substrates is polished (and hence leveled) and then the second major surface of the sheet of natural stone is polished (and leveled).

Polishing and leveling of the ceramic substrate establish a flat datum plane by which the natural stone can be precisely leveled and polished. This enables the production of the above-described panel and tiles having parallel major surfaces.

Each ceramic substrate may have a plurality of raised protrusions separated by recesses on its back surface, i.e., the surface to face the installation surface. Each of the protrusions have a longitudinal axis which forms an angle of less than 90°, preferably 45°, with an edge of the substrate. The pattern of protrusions on each substrate forms an overall pattern with adjacent substrates which enables the panel to be cut into tiles of desired shape and retain a sufficient number of protrusions in the desired pattern. Such protrusions facilitate installation since the recesses between protrusions act as reservoirs for the adhesive used to install the tiles or panels. If installation is performed on a flat installation surface, the tiles or panels may be installed with the protrusions in contact with the installation surface. Thus, the floating technique required to install conventional marble tiles is not necessary.

A method for installing a laminated tile according to the present invention thus includes providing a plurality of laminated tiles, each of the laminated tiles comprising a ceramic substrate or ceramic substrates having opposed major surfaces, a layer of natural stone, and a first adhesive bonding the layer of natural stone to one of the opposed major surfaces of said ceramic substrate(s); providing an installation surface; selecting a second adhesive having adhesive properties chosen for attaching the ceramic substrate(s) to a surface; coating the installation surface with the second adhesive; and applying the plurality of laminated tiles to the second adhesive.

Since the tiles of the present invention have little or no thickness variation across the tile or from tile to tile, the edges of adjacent tiles will be at the same even height giving a smooth mirror-like finish to the stone layers if installed on a flat installation surface.

BRIEF DESCRIPTION OF THE DRAWINGS

FIG. 6 is a block diagram showing the method of installing the tile product of the present invention.

BEST MODE FOR CARRYING OUT THE INVENTION

Figure 2:
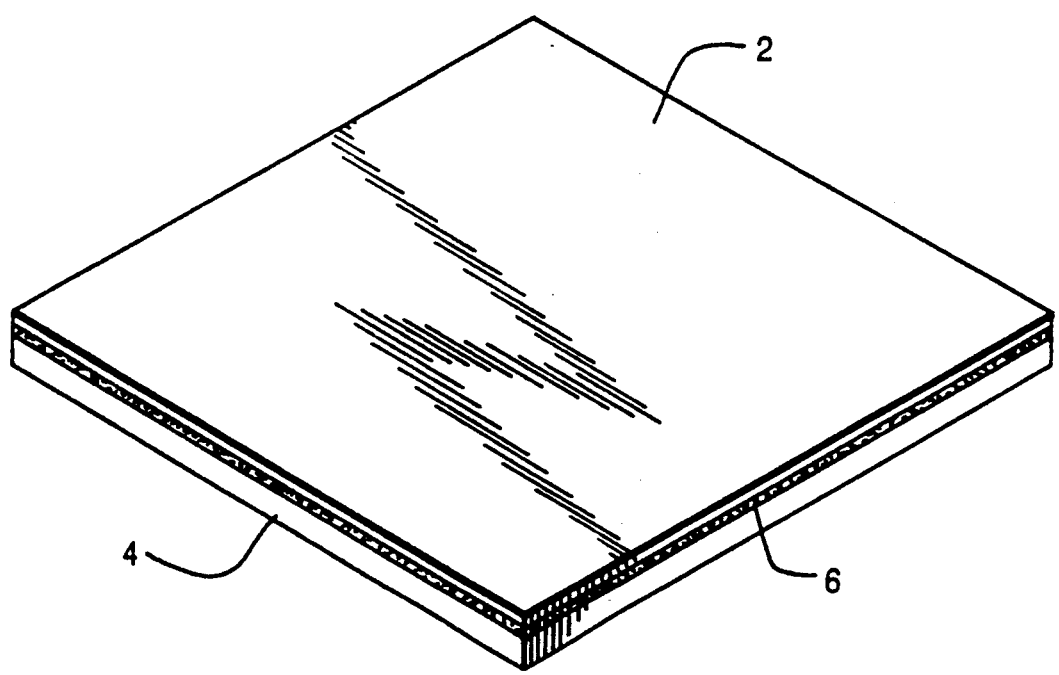
FIG. 2 is a perspective view of the laminated tile of the present invention.

As shown in FIG. 2, the tile product of the present invention is made of a layer of natural stone 2 bonded to a substrate 4 by bonding material 6. The tile may be made in any convenient shape such as the square shape shown in FIG. 2. The tile may be made in any convenient size such as about 10 mm × 10 mm (about 4-¼″ × 4-¼″) square or about 30 mm × 30 mm (about 12″ × 12″) square. Of course, other sizes and shapes may be utilized. For example, wall panels about 0.6 m × 1.2 m, 1.2 m × 1.2 m or 1.2 m × 2.4 m (i.e., about 2′ × 4′, 4′ × 4′ or 4′ × 8′, respectively) may be provided.

The natural stone 2 is preferably marble. However, other stones such as travertine, granite, limestone, slate, sandstone, onyx, quartzite, jade, bluestone, serpentine, silicified wood, etc., may also be used. Fossilstone is an example of a naturally-occurring type of marble-like stone which may be used. Fossilstone is mined in, e.g., Cebu, Philippines. An analysis of fossilstone reveals that it is legally classified as marble, i.e., is a carbonated crystallized rock that can, once polished, have a nice finish and may be used as an ornamental stone. Fossilstone is one preferred type of stone since, among other things, it can be found in a wide variety of colors. Moreover, the surface of the fossilstone is stain-resistant.

A single piece of natural stone preferably serves as the natural stone 2 of the tile product of the present invention in view of the efficiencies of manufacturing such a product according to the method of the present invention. However, it is also possible to use a plurality of pieces of natural stone as explained in U.S. application Ser. No. 07/177,947 now U.S. Pat. No. 4,931,331. The use of a plurality of pieces permits decorative patterns to be achieved and may simplify the cutting operations required to produce the individual laminates in that the use of smaller pieces may simplify handling operations of the stone blocks from which the laminates are cut and lessen waste material. For example, rough fossilstone can be cut into rectangular strips for adherence to a square ceramic base. If a plurality of strips are used, the edges of the strip are planed and polished such that when they are laid together side-by-side, they form a virtually seamless tile.

The natural stone 2 may be cut to have, preferably, a thickness of about 3 mm to 7 mm, more preferably 5 mm, and subsequently polished as described hereinafter to have a thickness of about 3 mm to 5 mm, more preferably 4 mm.

This substrate 4, which is substantially more than a reinforcing component, has the physical properties and characteristics necessary to strengthen and increase the desirable qualities of the natural stone 2, and other materials including agglomerates cast in resin. Relying on the definitions in ASTM C242-87 and ANSI A137.1-1988, the substrate 4 is best described as a ceramic sub-surfacing unit, usually relatively thin in relation to the facial area, made from clay or a mixture of clay and other ceramic materials, called the body of the unit, having an unglazed face and fired above red heat in the course of manufacture to a temperature sufficiently high to produce the specific physical properties and characteristics desirable in a reinforcing unit for the natural stone 2, and other materials.

The clays are natural mineral aggregates, mainly made of hydrous aluminum silicates; they are plastic when sufficiently wetted, rigid when dried en masse, and vitrified when fired to a sufficiently high temperature. The substrate 4 may have a non-vitreous, semi-vitreous, vitreous or impervious body as these terms apply to floor and wall tiles. The substrate 4 may be a natural clay tile, a ceramic mosaic tile, a paver, a porcelain tile, a quarry tile, a special purpose tile, an unglazed tile or other ceramic suitable for reinforcing the natural stone 2 and other materials.

Due to the large variations in compositions, it is difficult to provide the chemical composition for each variation of the substrate. However, many porcelain compositions will be found in these ranges:

| | |
|---|---|
| $SiO_2$ | 68–74% |
| $Al_2O_3$ | 18–22% |
| KNaO | 1–3% |
| CaO/MgO | 0.25–1% |
| $Fe_2O_3$ | 0.25–1% |
| $TiO_2$ | 0.25–1% |

Natural clay compositions, as might be found in typical red quarry or paver tile, would be in the following ranges:

| | |
|---|---|
| SiO$_2$ | 65–70% |
| Al$_2$O$_3$ | 13–18% |
| KNaO | 2–4% |
| Fe$_2$O$_3$ | 3–5% |
| FeO | 2–3% |
| TiO$_2$ | 0.25–1% |
| CaO/MgO | 0.25–2% |

Talc and talc/pyrophylite compositions vary widely. However, an estimate of the compositions would show:

| | |
|---|---|
| SiO$_2$ | 60–75% |
| Al$_2$O$_3$ | 15–25% |
| MgO | 2–20% |
| KNaO | 0.25–2% |
| Fe$_2$O$_3$ | 0.5–1% |
| TiO$_2$ | 0–0.5% |

It should be noted here that the substrate 4 is not usually specified or sold by chemical composition. Normal specifications primarily deal with physical characteristics, and any composition meeting those specifications is satisfactory.

The substrate 4 can be made by the dust-press method, among other ways (e.g., the plastic method), in which the body materials are ground into a liquid mud, run through a sprayer and dried to a fine powder, which is pressed into a predetermined shape and design using great pressure (e.g., up to 1,200 tons). After the substrate 4 is formed, it is fire-hardened in a kiln at a temperature sufficient to give it the optimum physical properties and characteristics to satisfy, among other needs, the natural stone 2 reinforcing requirements for the specific application(s) of the products being manufactured.

The substrate is typically vitrified, i.e., changed into a glass-like substance by fusion due to heat; glass may be a component of the body mixture. However, some substrates may not be vitrified, for example, those for wall applications. During fire-hardening, the substrate usually shrinks by up to 10% or more, primarily due to the loss of water which is not reabsorbed upon cooling. The substrate 4 should not be smooth-surfaced, e.g., glazed, on the upper surface. The upper surface should contain microscopic pores and crevices to be filled by the adhesive sufficiently to allow the substrate 4 to be fused to the undersurface of the facing stone layer 2 during the manufacturing process. A bisque-like substrate 4 is preferred, i.e., an unglazed ceramic substrate 4 that is not to be glazed, but is hard-fired and vitreous. These qualities are achieved via body composition and firing procedures.

The physical properties of the ceramic substrate 4 can be tailored for specific applications, i.e., a "special purpose," by altering each or all of the body constituents and procedures for molding and firing. However, all of the variations of the substrate 4 have a series of essential characteristics. Generally, all of the substrates 4 have the capability to reinforce the dimensional stability and the mechanical and structural strengths, among the other positive physical attributes, of the various natural stone layers 2 of the product, and other materials. The substrates 4 have high compressive strengths (up to 40,000 psi) and good tensile strengths (up to 15,000 psi). While they are much more lightweight than natural stone, their density is in the range for masonry materials. Their coefficients of thermal expansion are the same as natural stone for all practical purposes, and they have negligible dimensional movement with moisture changes.

The substrates 4 typically are frost-proof, i.e., water absorption is 3% or less, fire-proof, and provide superior sound insulation. They are relatively poor insulators against the steady transfer of heat. When the heat source is periodic, however, as during the daily summer heat-gain cycle, their density and low specific heat (0.24) makes them a high capacity heat sink. For example, with a panel according to the present intention, heat of the exterior building surface never reaches the interior before nocturnal cooling takes place. Such heat capacity (time-lag effect) explains the cool interiors of heavy fortresses or churches located in desert or tropical climates.

The substrate 4 does not reduce the workability of the tile or panel relative to all natural stone tiles or panels. The substrate 4 actually enhances the workability of the stone, and is made of a material with working qualities and techniques which are wholly familiar to the masonry industry. Workability is a very important quality in natural stone products and the industry grade stones on their workability. For example, classification of marble is done by producer and finisher members of the Marble Institute of America (MIA). MIA says: "The groupings—A, B, C, and D—should be taken into account when specifying marble, for all marbles are not suitable for all building applications. This is particularly true of the comparatively fragile marbles classified under Groups C and D which may require additional fabrication before or during installation."

These four groupings are:

Group A—Sound marbles and stones, with uniform and favorable working qualities.

Group B—Marbles and stones similar in character to the preceding group, but working qualities somewhat less favorable; may have natural faults; a limited amount of waxing and sticking necessary.

Group C—Marbles and stones with some variations in working qualities; geological flaws, voids, veins and lines of separation are common; it is standard practice to repair these variations by sticking, waxing and filling; liners and other forms or reinforcements employed when necessary.

Group D—Marbles and stones similar to the preceding group, but containing a larger proportion of natural faults, and a maximum variation in working qualities, requiring more of the same methods of finishing. This group comprises many of the highly colored marbles prized for their decorative qualities.

The present invention actually improves workability because the adhesive 6 seals the faults in marble and other natural stones to strengthen and enhance them—thus filling the subsidiary need, in conjunction with the substrate, for making Group C and D marbles strong and durable. The ceramic substrate 4 is superior to Group A marbles and stones in working qualities because it is homogeneous and can be worked at least as easily with the same tools and techniques.

The substrate 4 is formed of a material which has a coefficient of expansion close to that of the natural stone 2, such as ceramic. Preferred ceramic materials include bisque-type materials which are fine-grained, low sand content vitreous materials and which are moisture-impervious, strong and impact-resistant. The substrate 4 is most preferably unglazed bisque tile which is vitrified through high-temperature firing at a minimum of 1,050° C. Firing fuses the clay into a substance whose coefficient of expansion closely matches that of the natural stone 2. If the firing temperature is below about 1,050° C., the ceramic will not be moisture-impervious, and will have low strength and density. If the firing temperature is too high, however, the clay will fuse into a glass-like substance which is not impact-resistant. Neither is preferable.

The overall thickness of the composite tile product with the top laminate(s) 2 and ceramic substrate(s) 4 may be made less than a solid natural stone tile product of comparable impact and load-bearing resistance as a consequence of the laminates and matched characteristics of the laminates and ceramic substrate. For example, the overall thickness of a composite floor or wall tile according to the present invention may be 6 mm (about ¼") to 10 mm (about ⅜") or more, depending on the amount and impact of traffic across the tile in the case of a floor tile, and the weight and application in the case of a wall tile. The natural stone layer in such a tile may be about 3 mm (about ⅛') thick. Preferably, the physical properties of the laminate(s) 2 and the ceramic substrate(s) 4 are as closely matched as possible.

The thermal expansion coefficients of various natural stones are shown in the following table:

| Natural Stone | Coefficient of Expansion (in/in/°F.) |
| --- | --- |
| Granite | $4.7 \times 10^{-6}$ |
| Limestone | $4.4 \times 10^{-6}$ |
| Marble | $5.6 \times 10^{-6}$ |
| Sandstone | $6.1 \times 10^{-6}$ |
| Slate | $5.8 \times 10^{-6}$ |

It is desirable that the ceramic have a thermal expansion coefficient close to that of the natural stone selected to avoid the possibility that mismatched thermal expansion coefficients will cause the tile to buckle.

The material of which the substrate is made is preferably selected so that the substrate is fluid-impervious. A laminated tile having a fluid-impervious substrate will be stable in moist environments, such as shower installations and below ground level flooring installations, and will prevent discoloration of lighter-colored natural stones which would otherwise occur due to seepage of water through the underlayment to mix with naturally-occurring salts in the stone to discolor the surface. Such a tile will resist delamination in moist environments. The substrate also serves as a sound-insulating material.

The substrate preferably has high dimensional stability to impart strength to the laminated tile. I is also preferable to form the substrate with dimensions, e.g., squareness, which can be exactly reproduced from substrate to substrate. The laminated tile formed with such substrates is easily installed and can, if desired, be installed in such a manner that the edges of adjacent tiles align without or with very little space therebetween so that grout is unnecessary.

The substrate of the finished product may have, preferably, a thickness of 3 mm (about ⅛") to 10 mm (about ⅜").

Figure 3A:
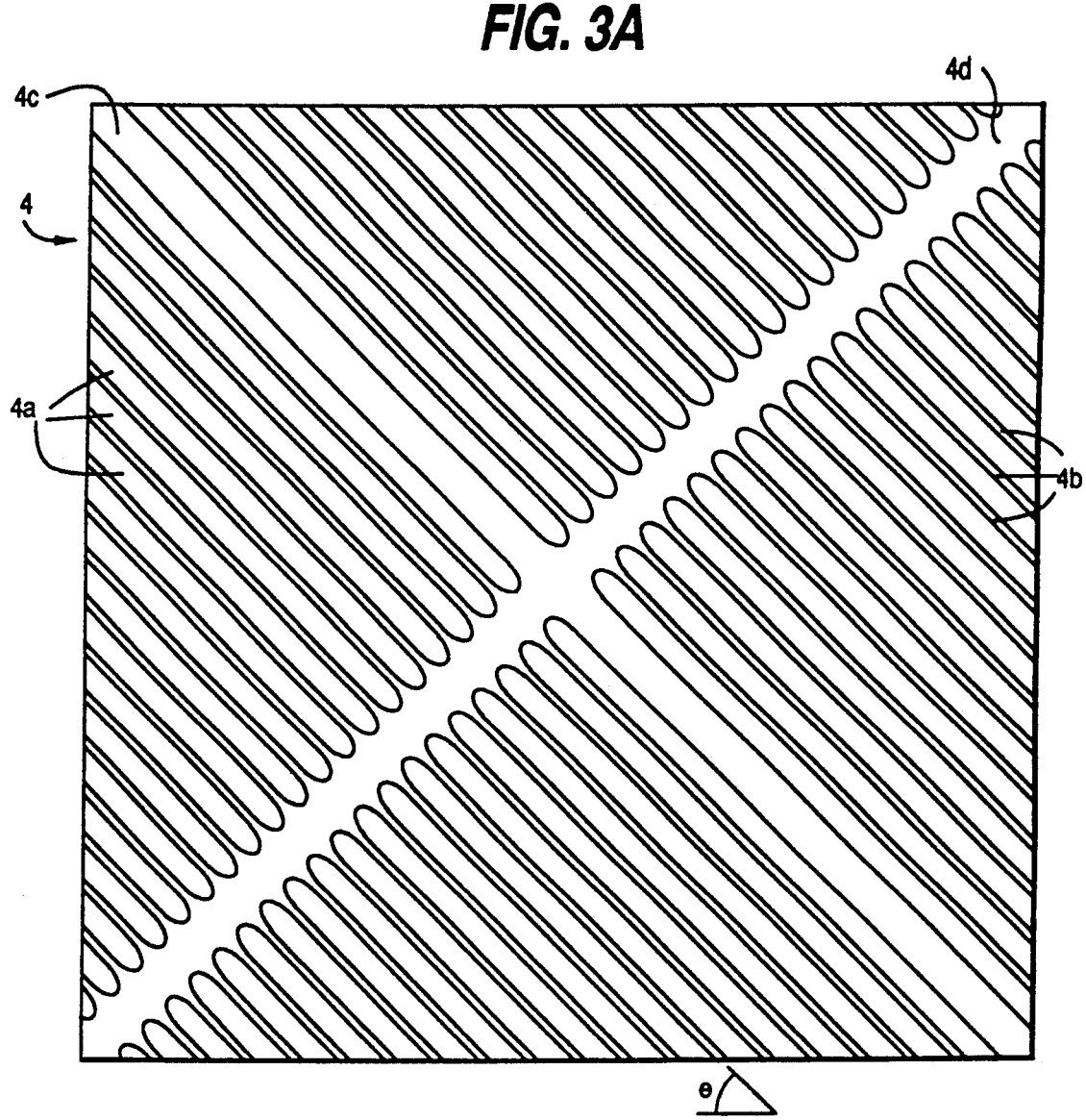
FIG. 3A is a plan view of an example of a substrate of the laminated tile of the present invention.
Figure 3B:
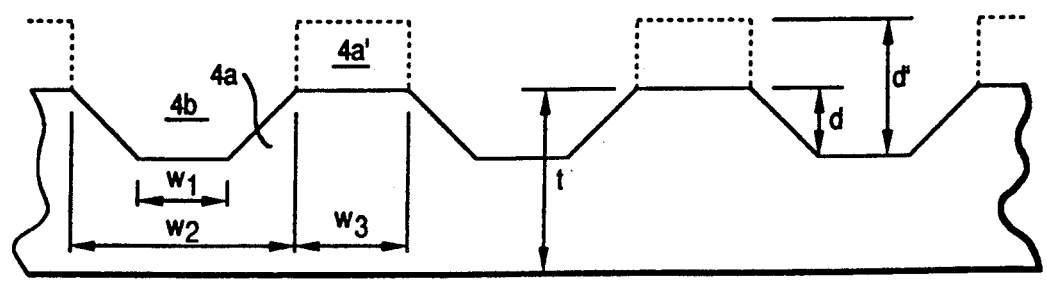
FIG. 3B is an enlarged cross-sectional view of a portion of the substrate shown in FIG. 3A.

The substrate 4 preferably has a plurality of raised protrusions in any desired number and pattern. A preferred pattern is shown in FIGS. 3A and 3B. The protrusions 4a allow the use of a "thin-set" adhesive to be described later. Upon installation, the surfaces of the protrusions 4a contact the surface on which the tile is installed. The spaces or recesses 4b between protrusions 4a are the primary reservoirs for the adhesive.

FIG. 3A is a plan view of a substrate 4 according to a preferred embodiment of the present invention. The substrate 4 has a plurality of parallel protrusions 4a and parallel recesses 4b. The protrusions 4a and recesses 4b have a longitudinal axis extending diagonally across the substrate 4. Wider recesses 4c and 4d cross each other and each extend diagonally across the substrate 4 between opposite corners thereof. One of the wider recesses 4c has a longitudinal axis parallel to the protrusions 4a and recesses 4b, while the other wider recess 4d has a longitudinal axis perpendicular to the protrusions 4a, recesses 4b and wider recess 4c. The protrusions 4a, recesses 4b, 4c and 4d are arranged such that the longitudinal axis thereof forms an angle $\theta$ with respect to at least one edge of the substrate 4. The angle $\theta$ is preferably less than 90° and, most preferably, 45°. As can be seen, the substrate 4 preferably has a square face.

A preferred shape of the protrusions 4a and recesses 4b is shown in the cross-sectional view of FIG. 3B. Also shown in 3B in phantom lines is an extension 4a' of protrusions 4a, which extension is removed during manufacture of the laminated tile product, as explained more fully hereinafter. As shown in FIG. 3B, the recesses have a depth d in the final product which is equivalent to the height cf the protrusions 4a. The recesses have a cross-sectional shape in the form of a truncated V. The bottom of the recesses 4b have a width $w_1$, while the top of the recesses have a width $w_2$ equivalent to the space between protrusions 4a. The protrusions 4a have a width $w_3$. The substrate 4, after polishing, has a thickness t. The dimensions of a preferred embodiment of the substrate (after polishing) are as follows:

t = 6 mm
d = 2 mm
$w_1$ = 3 mm
$w_2$ = 7 mm
$w_3$ = 4 mm.

The preferred depth d' of the protrusions 4a before polishing is 4 mm.

The wider recesses 4c and 4d preferably have a width of about 16.75 mm.

The adhesive 6 is one that is indifferent to or, preferably, enhanced by heat and pressure, e.g., is heat-cured. Heat makes the adhesive 6 less viscous so that it flows into cracks, crevices and other imperfections in the stone 2 to seal the same and make a stronger product. Preferably, the adhesive hardens quickly. For example, the adhesive 6 may contain a relatively large amount of hardener. For example, the adhesive may consist essentially of 1 liter Polylite (a polyester resin used, e.g., in the manufacture of boat hulls and available from Owens-Corning Fiberglass, Inc., and Dow-Corning Corp.), 0.25 liter styrene, 10 drops cobalt in a paste carrier heated to the liquid state, and 30 cc hardener. However, other adhesives may also be utilized.

The adhesive 6 may be in the form of sheets which are placed between the substrates 4 and the stone sheets 2.

Figure 4:
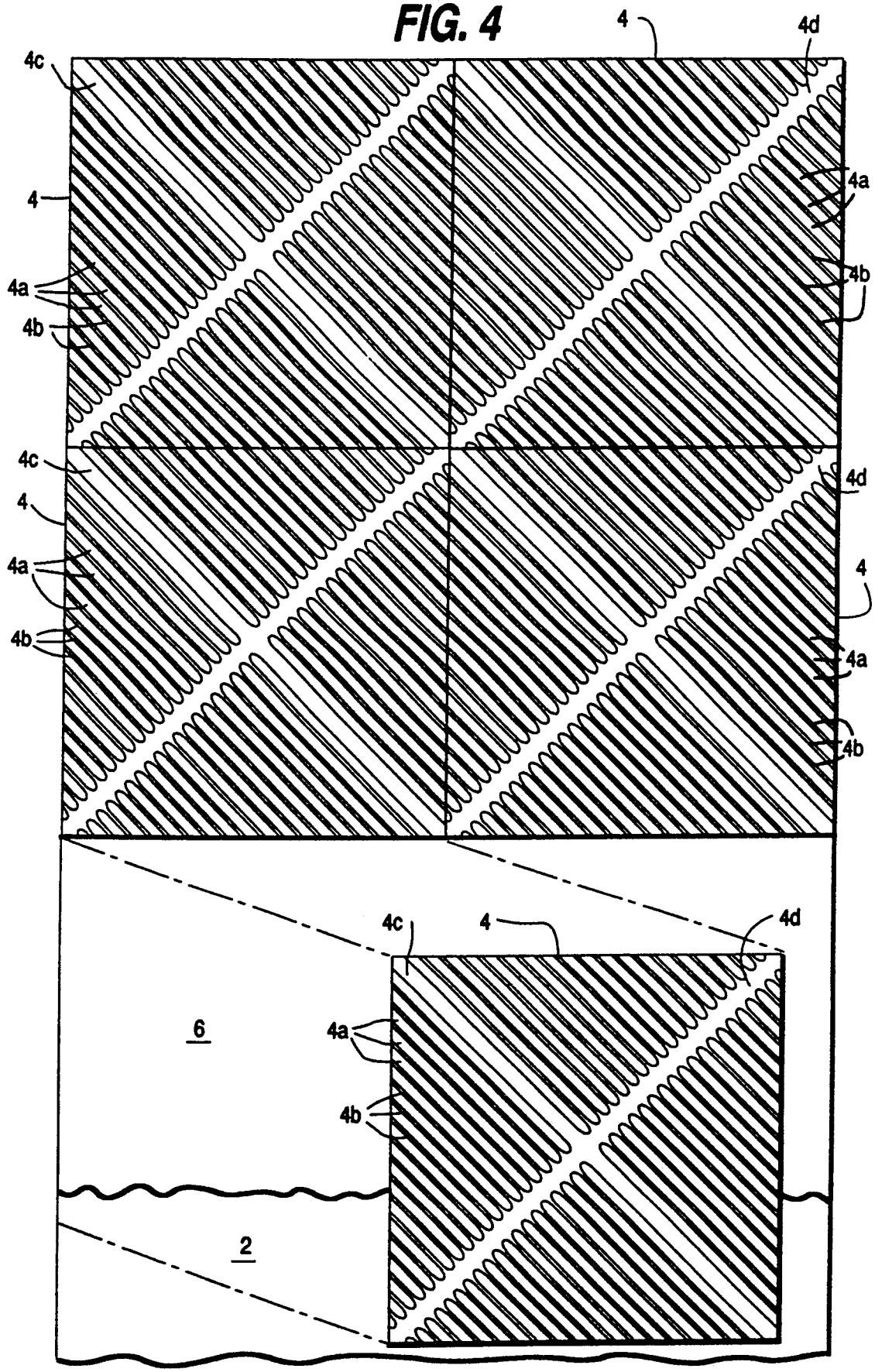
FIG. 4 is an exploded perspective view of the laminated tile of the present invention during the process of manufacturing the same.

FIG. 4 is an exploded view of a partially assembled product. As shown in FIG. 4, the laminated tile product of the present invention preferably comprises a plurality of ceramic substrates 4. The substrates 4 are preferably abutted against one another. That is, at least one edge of each of the substrates 4 is arranged to be in contact with an edge of at least one of the remaining substrates 4.

The partially assembled product shown in FIG. 4 includes a plurality of substrates 4 having protrusions 4a and recesses 4b, 4c and 4d in accordance with the preferred embodiment shown in FIGS. 3A and 3B. By virtue of the pattern and shape of the protrusions 4a and the recesses 4b, 4c and 4d, the assembled product has a symmetrical pattern of protrusions 4a and recesses 4b, 4c and 4d as shown in FIG. 4. It will be recognized that, by virtue of this pattern, the respective protrusions 4a on adjacent ceramic substrates 4 form a continuous protrusion from one substrate 4 to an adjacent substrate 4 across the joint between adjacent edges thereof, as do recesses 4b, 4c and 4d.

If the product is used in the form of a sheet having a plurality of substrates thereon, the symmetrical pattern shown in FIG. 4 serves to more evenly distribute stress across the entire sheet. That is, absent the use of protrusions 4a, it is believed the greatest stress or tendency to fracture may occur at portions corresponding to the joints between adjacent ceramic substrates 4. As can be appreciated, these joints run laterally and longitudinally across the panel. The preferred pattern of protrusions 4a and recesses 4b, 4c and 4d run diagonally across the panel and are believed to distribute stress evenly across the entire surface of the panel to avoid any tendency for fracture of the joints.

Moreover, if the sheet is cut into a plurality of tiles, the symmetrical pattern ensures that each tile cut from the sheet has sufficient protrusions and recesses thereon. Moreover, due to the symmetrical pattern, the edges of each cut tile will be sufficiently supported.

The laminated tile product of the present invention can be made lighter in weight than natural stone slabs of comparable size. This has tremendous cost savings advantages, especially in transportation, handling and construction (e.g., lower strengths of framework can be used for building exteriors).

Figure 5:
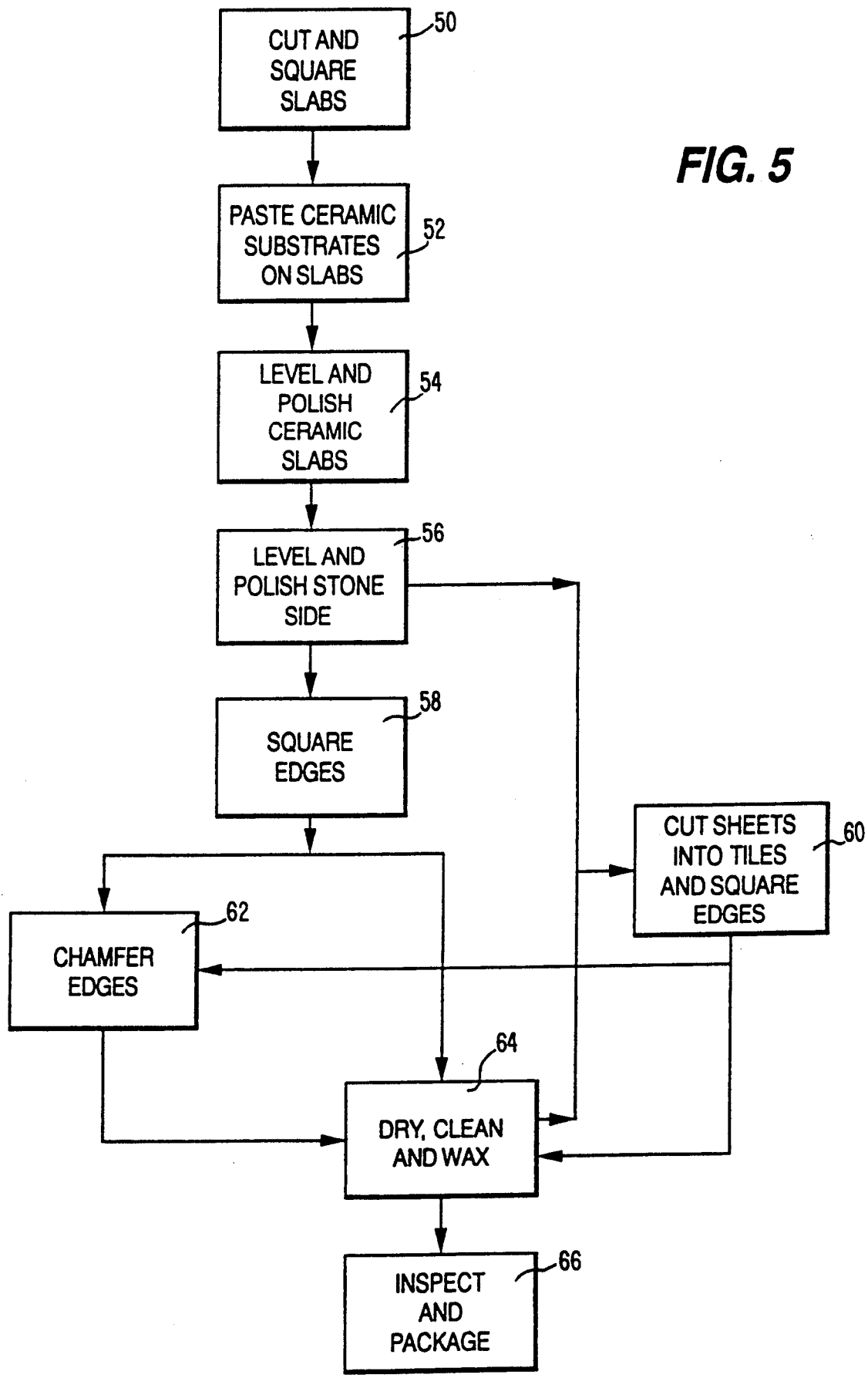
FIG. 5 is a block diagram showing the me&:hod for manufacturing the laminated tile product of the present invention.

As shown in FIG. 5, the tile product of the present invention is manufactured by first cutting a marble block into a plurality of slabs and squaring each slab as illustrated at point 50. It is preferable to use a plurality, e.g., nine, marble block cutting tools, so that a plurality of stone blocks may be cut at one time. It is preferred that conventional marble block cutting tools be modified to include four vertical, parallel blades separated by a predetermined distance so as to cut the plurality of stone blocks into a plurality of stone slabs of desired thickness. The use of a plurality, e.g., four, blades enables the marble block cutting tools to operate with less vibration and, thus, achieve a more precise cut. Conventional marble squaring machines, preferably one for each marble block cutting tool, are used to square each cut slab. The surface area of each squared slab is chosen based on the desired end product. For example, if the end product is a panel, the squared slab may be 0.6 m × 1.2 m, 1.2 m × 1.2 m, 1.2 m × 2.4 m, etc. If the end product is a plurality of tiles, the slab is cut and squared to be a size corresponding to a multiple of the tile size plus additional surface area to allow for squaring of the cut tiles as described hereinafter.

Each squared stone slab is then transported to a pasting area where a plurality of ceramic substrates are pasted to each squared slab as illustrated at point 52. The ceramic substrates are preferably abutted against one another as shown in FIG. 4. At this stage of the production, a laminated sheet is formed comprising a squared stone slab having a plurality of ceramic tiles adhered to a major surface thereof by an adhesive. The adhesive is at least partially cured and is strong enough to adhere the ceramic substrates to the squared slab during subsequent manufacturing steps.

The subsequent steps are accomplished using an assembly line-type arrangement. Preferably, a plurality, e.g., three, assembly lines are used.

As shown in FIG. 5, the next manufacturing step is preferably the leveling and polishing of the ceramic substrate side of the laminated sheets as illustrated at point 54. This is preferably accomplished by running the laminated sheets through a conventional continuous belt polishing machine. As previously described, the ceramic substrate 4 is leveled and polished so as to remove a portion 4a' of the protrusions 4a which are shown in FIG. 3B to provide a flat datum plane spanning the entire surface of the ceramic substrate side.

As shown in FIG. 5, the natural stone side of the laminated sheets is then leveled and polished, e.g., by conventional continuous belt polishing machines as illustrated at point 56. As a consequence of the previously established datum plane produced at point 54, the polishing step produces a final product having opposed flat major surfaces which do not vary appreciably in thickness from piece to piece. When successive pieces have flat parallel opposed major surfaces including the decorative surface installation on a substrate, appreciably less "floating" is involved and "thin-set" adhesive may be utilized. Conventional means including, e.g., idle roller conveyors, may be used to transport and position the laminated sheets such that the natural stone face can be polished.

As stated above, the leveling and polishing steps provide a substantially flat reference plane on both the front stone face of the laminated sheet and the back substrate side of the laminated sheet, and provide laminated sheets having consistent thickness from sheet to sheet. Moreover, the heat and pressure from the leveling and polishing preferably cause the adhesive to form an unbroken and unblemished high-strength bond between the surface of the natural stone and the surface of the ceramic substrates and, as previously described, makes the adhesive less viscous so that it flows into cracks, crevices and other imperfections in the stone to seal the same and make a stronger product. If desired, the laminates can be processed through conventional puttying lines to fill any imperfections in the stone face and again be polished by conventional continuous belt polishing machines.

The above-described apparatus is available through Terzago S.p.A. of Gravellona Toce, Italy.

If the end product is desired to be large sheets, e.g., wall panels 0.6 m × 1.2 m, 1.2 m × 1.2 m or 1.2 m × 2.4 m (i.e., 2'×4', 4'×4' or 4'×8'), after polishing the stone side of the laminated sheet, the edges thereof may be squared, as shown in FIG. 5 at point 58. Alternatively, if smaller laminated tiles are desired, the sheets may be cut into tiles of desired size and the edges thereof squared as illustrated at point 60. Conventional continuous belt trimming machines and head squaring machines can be used at this stage of production.

Longitudinal and/or lateral cuts are preferably made to the panel to obtain square or rectangular tiles therefrom. The cuts may be made along portions corresponding to joints between ceramic substrates. As can be appreciated, the preferred pattern of protrusions 4a and recesses 4b, 4c and 4d is such that each of the cut tiles has a sufficient number of protrusions and recesses running diagonally across the tile. Since the protrusions and recesses run diagonally across each tile, each of the edges thereof has a plurality of raised and a plurality of recessed portions. It will be recognized that if the protrusions and recesses were to run laterally and/or longitudinally, one or more edges of the tile might be unsupported, i.e., correspond to a recess only. This possibility is avoided by the preferred pattern heretofore described.

After squaring of the edges of the laminated sheet or, alternatively, cutting the sheet into tiles and squaring the edges of the tiles, the edges of the sheet or tiles may be chamfered by conventional chamfering machines, if desired as illustrated at point 62. The sheets or tiles are then dried, cleaned and waxed in conventional drying and cleaning lines and waxing units as illustrated at point 64. The finished laminated sheets or tiles can be inspected at conventional check terminals and subsequently packaged at point 66.

Figure 1:
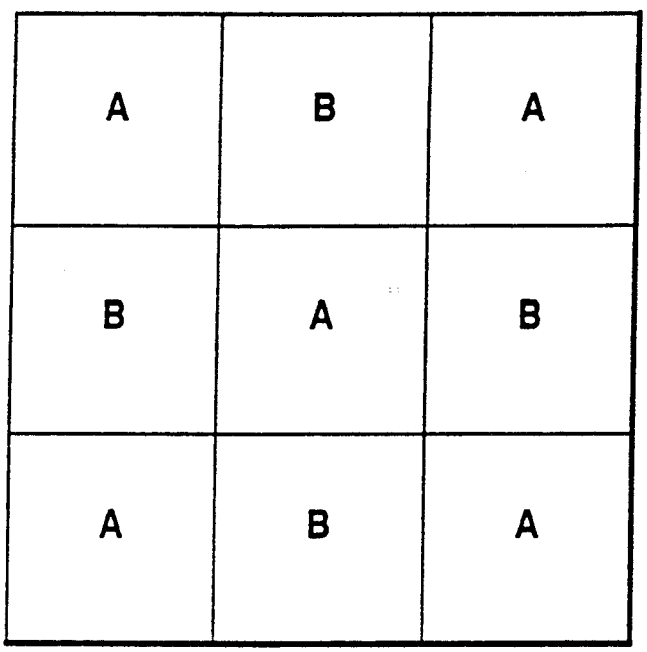
FIG. 1 is a schematic view of a typical natural stone installation design.

The laminated tile product of the present invention is much simpler to install than conventional natural stone tiles, especially for multi-color and/or multi-stone installation designs such as shown in FIG. 1.

As shown in FIG. 6, after providing the laminated tile product and preparing the surface on which the tile is to be installed as illustrated at points 70 and 72, an appropriate adhesive is selected to produce a strong bond between the ceramic substrate 4 and the surface to which the tile is to be attached as illustrated at point 74. Because the ceramic substrate 4 is uniformly strong and has a back surface which is uniformly rough, the substrate 4 will easily adhere to many adhesives. Water-based mastics used to adhere ceramics such as bisque are well known and are made by all major companies in the field, and are available "off the shelf."

The adhesive is applied at point 76 to the installation surface, e.g., the floor or wall, with a conventional flat-edged trowel for ensuring continuous coverage and combed with a notch-edged trowel to ensure uniform thickness. Trowels having notches of various depths are available for various applications. The tile is then applied to the adhesive and pressed to the installation surface as illustrated respectively at points 78 and 80. Adhesive applied in this manner is known in the art as a "thin-set" adhesive. The tile substrate 4 preferably has protrusions shown in FIG. 4, which contact the installation surface, with the critical space for the adhesive being defined by the spaces between protrusions. Of course, a "thick-bed" installation can be used if the installation surface is especially uneven.

The installation method of the present invention is most advantageous in comparison with the conventional method of installing conventional natural stone tile, especially with regard to multi-color and/or multi-stone installation designs such as that shown in FIG. 1. According to the present invention, since a ceramic material can be used as a substrate 4 for a plurality of different colors or types of natural stones 2, a single adhesive can be selected and applied to the installation surface even if a plurality of colors or types of natural stones are desired in the installation design.

The present invention permits relatively unskilled workers to install the laminated tile, i.e., does not require the services of skilled "marble men." Accordingly, the present invention permits "do-it-yourself" installations.

The present invention permits installation of a broader range of natural stone. For example, stones previously thought to be too brittle may now be installed since a layer 2 of such stone is supported by the substrate 4. In addition, small precious stones can be added between other stones on a single laminated tile.

While we have shown and described the preferred embodiments in accordance with the present invention, it is understood that the same is not limited thereto, but is susceptible of numerous changes and modifications as known to one having ordinary skill in the art, and we therefor do not wish to be limited to the details shown and described herein, but intend to cover all such modifications as are encompassed by the scope of the appended claims.

We claim:

1. A method for producing a laminated tile comprising:
    providing a sheet of natural stone having opposed first and second major surfaces;
    providing a plurality of ceramic substrates, each of said plurality of ceramic substrates having opposed first and second major surfaces;
    providing an adhesive material on at least one of said first major surface of said sheet of natural stone and said first major surface of each of said plurality of ceramic substrates;
    assembling said plurality of ceramic substrates and said sheet of natural stone to form a laminated assembly such that said first surface of each of said plurality of ceramic substrates faces said first major surface of said sheet of natural stone with said adhesive material therebetween; and
    polishing said second major surface of said sheet of natural stone.

2. A method according to claim 1, further comprising:
    polishing said second major surface of each said plurality of ceramic substrates after forming said laminated assembly and prior to polishing said second major surface of said sheet of natural stone.

3. A method according to claim 2, wherein:
    said second major surface of each of said ceramic substrates has a plurality of protrusions and a plurality of recessed portions, and wherein only a portion of the depth of said protrusions is removed during the step of polishing said second major surface of each of said plurality of ceramic substrates to provide a flat datum plane over an entire surface of said laminated tile defined by the second major surfaces of the ceramic substrates.

4. A method according to claim 1, wherein:
    said sheet of natural stone and said plurality of ceramic substrates are assembled such that at least one edge of each of said plurality of ceramic substrates is in contact with an edge of at least one adjacent one of said plurality of ceramic substrates.

5. A method according to claim 1, further comprising:
    cutting said laminated assembly into a plurality of laminated tiles.

6. A method according to claim 5, wherein:
    said laminated assembly is cut along lines corresponding to joints between said plurality of ceramic substrates.

7. A method according to claim 1, wherein:
    layer of natural stone causes heat to be applied to said adhesive which bonds said layer of natural stone to said substrate.

8. A method according to claim 1, wherein:
    said adhesive contains cobalt.

9. A method according to claim 1, wherein:
said natural stone is selected from the group consisting of marble, travertine, granite, sandstone and fossilstone.

10. A method according to claim 1, wherein:
said substrate is made of an unglazed ceramic bisque.

11. A method according to claim 1, wherein:
said substrate is impervious to fluids.

12. A method according to claim 1, wherein:
said substrate has a plurality of raised protrusions covering a portion of said second major surface of said substrate.

13. A method according to claim 12, wherein:
said plurality of raised protrusions extends diagonally across at least a portion of said second major surface of said substrates and are parallel to one another and separated from one another by recesses.

14. A method according to claim 13, wherein:
each of said plurality of raised protrusions has a longitudinal axis which forms an angle of less than 90° with an edge of said substrate.

15. A method according to claim 14, wherein:
said angle is 45°.

* * * * *